US012807409B2

(12) United States Patent
Hammerschmid et al.

(10) Patent No.: US 12,807,409 B2
(45) Date of Patent: Nov. 24, 2026

(54) SHELF SYSTEM

(71) Applicant: MAGNA STEYR Fahrzeugtechnik Gmbh & Co KG, Graz (AT)

(72) Inventors: Gerhard Hammerschmid, Weiz (AT); Gerhard Krauser, Lang (AT); Maximilian Meisterl, Graz (AT); Wolfgang Trummer, Graz (AT); Christian Wieland, Feldkirchen bei Graz (AT)

(73) Assignee: MAGNA STEYR Fahrzeugtechnik Gmbh & Co KG, Graz (AT)

( * ) Notice: Subject to any disclaimer, the term of this patent is extended or adjusted under 35 U.S.C. 154(b) by 377 days.

(21) Appl. No.: 18/613,274

(22) Filed: Mar. 22, 2024

(65) Prior Publication Data

US 2024/0336432 A1 Oct. 10, 2024

(30) Foreign Application Priority Data

Apr. 6, 2023 (DE) ......................... 102023203215.5

(51) Int. Cl.
*G07F 7/00* (2006.01)
*B65G 1/04* (2006.01)
*B65G 1/137* (2006.01)

(52) U.S. Cl.
CPC ......... *B65G 1/0492* (2013.01); *B65G 1/1373* (2013.01)

(58) Field of Classification Search
CPC ........ B65G 2201/02; B65G 2201/0235; B65G 2201/0294; G06Q 10/08; G06Q 10/087
(Continued)

(56) References Cited

U.S. PATENT DOCUMENTS 9,037,286 B2 * 5/2015 Lert ..................... B65G 1/0492 414/280
2009/0136325 A1 5/2009 Schafer
(Continued)

FOREIGN PATENT DOCUMENTS

DE 102014117235 A1 5/2016
DE 102014118896 A1 6/2016
(Continued)

OTHER PUBLICATIONS

German Patent and Trademark Office search report for DE102023203215.5 mailed on Mar. 19, 2024.
(Continued)

*Primary Examiner* — Yolanda R Cumbess
(74) *Attorney, Agent, or Firm* — Jordan IP Law, LLC; Todd A. Vaughn

(57) ABSTRACT

A shelving system for sequencing goods from a high-bay warehouse into sequencing racks. The shelving system includes the high-bay warehouse with at least one sequencing level at a floor level and a plurality of storage levels operable to store large load carriers at storage locations thereof during normal operation of the shelving system, the large load carriers being operable to store goods of one type. At least one lift is operable for a vertical transport of the large load carriers is arranged in the high-bay warehouse. At least one transverse transfer carriage is arranged in each storage level for a horizontal transport of the large load carriers. A control unit is operable to process sequencing orders for a transfer of large load carriers in a sequencing order from the storage levels to at least one second sequencing area in the at least one sequencing level.

20 Claims, 12 Drawing Sheets

(58) Field of Classification Search
USPC .................................................. 700/213–216
See application file for complete search history.

(56) References Cited

U.S. PATENT DOCUMENTS

| | | | | |
|---|---|---|---|---|
| 2020/0005226 | A1 * | 1/2020 | Sikka | G06Q 10/087 |
| 2020/0231385 | A1 | 7/2020 | Lisso | |
| 2021/0354919 | A1 * | 11/2021 | Liu | B65G 1/0435 |
| 2022/0002081 | A1 * | 1/2022 | Medford | B65G 1/0492 |
| 2022/0097966 | A1 * | 3/2022 | Brady | B65G 1/10 |
| 2022/0289479 | A1 * | 9/2022 | Traina | B65G 1/0492 |

FOREIGN PATENT DOCUMENTS

| | | | |
|---|---|---|---|
| EP | 1231164 | B1 | 5/2009 |
| EP | 3875403 | A1 | 9/2021 |
| WO | 2007137840 | A1 | 11/2007 |

OTHER PUBLICATIONS

European Patent Office Search Report for EP 24157336.9, Jul. 2024.

* cited by examiner

SHELF SYSTEM

CROSS-REFERENCE TO RELATED APPLICATIONS

The present application claims priority under 35 U.S.C. § 119 to German Patent Publication No. DE 102023203215.5, filed on Apr. 6, 2023, which is hereby incorporated by reference in its complete entirety.

TECHNICAL FIELD

The present disclosure relates to a shelving system for sequencing goods from a high-bay warehouse into sequencing racks.

BACKGROUND

It is known that goods can be stored in several levels in a fully automated high-bay warehouse, which is managed by a storage and retrieval unit, so that desired goods are transported from the high-bay warehouse to a workstation at floor level and also new goods, or goods delivered to the workstation but not used at the workstation, can be placed in order in the high-bay warehouse again.

It is also known that, in a sequencing process, several single-type loading units, hereinafter referred to as large load carriers, in each of which goods of the same type are received and stocked, are made available at a floor level and that a person removes individual parts or small load carriers from the provided large load carriers and places them on a common load carrier, namely in a sequencing rack.

For this purpose, many large load carriers are usually provided at the same time at the ground level, so that the goods for several sequencing orders can be removed from the large load carriers.

There are several drawbacks to such a sequencing process: long walking distances for people, sequencers, between multiple sequencing areas, long walking distances in a sequencing area during sequencing, a large amount of space required to provide many required goods, such as part variants, and a high risk of injury due to the coinciding work areas for forklifts and sequencers.

SUMMARY

It is an object of the present disclosure to specify a shelving system for sequencing goods that reduces at least some of the problems mentioned. In particular, shorter walking distances and thus faster, more efficient sequencing should be made possible.

The solution to the problem is provided by a shelving system for sequencing goods from a high-bay warehouse into sequencing racks, containing a high-bay warehouse with at least one sequencing level, in particular, at a floor level, and several storage levels, wherein large load carriers are stored at storage locations in the storage levels during normal operation of the shelving system, in each of which goods of one type are stored, wherein at least one lift for the vertical transport of the large load carriers is arranged in the high-bay warehouse, wherein the shelving system contains at least one transverse transfer carriage in each storage level for the horizontal transport of the large load carriers, wherein the shelving system contains a control unit, wherein the control unit is set up to process sequencing orders in such a way that the large load carriers required for a sequencing order are delivered from the storage levels to at least a second sequencing area in the sequencing level, while goods from the required large load carriers for another sequencing order in a first sequencing area are placed in order in a sequencing rack of the first sequencing area and vice versa, so that the large load carriers required for a sequencing order are delivered from the storage levels to the first sequencing area in the sequencing level, while goods from the large load carriers required for another sequencing order are placed in order in the second sequencing area in the sequencing level in a sequencing rack of the second sequencing area.

In accordance with the present disclosure, an automated high rack provides an employee or a robot, i.e., a "sequencer" that places the individual goods from large load carriers (GLT) into a sequencing rack in order, with exactly the material or component required for the next sequencing process/order, i.e., the corresponding, required large load carriers for the sequencing order, in a sequencing area. Two or more sequencing areas can be managed alternately by one person. During the sequencing in one sequencing area, a material change, i.e., the delivery of required large load carriers, takes place in at least one other sequencing area. The sequencer is not held back from the sequencing activity thereof by the material delivery in the other sequencing area and can then change to the other sequencing area that has been prepared in the meantime, which can preferably be located right next to the previously processed sequencing area. The material change includes not only the delivery of the large load carriers required for the next sequencing order, but also the collection of the large load carriers that are no longer needed from the previous sequencing order.

For the provision of the goods, the vertical and horizontal movements are divided among several mechanical components, namely at least one lifter, i.e., a lift, and transverse transfer carriages (QVW) for the horizontal movements in the levels, which allows the provision and return of several load carriers to be carried out within the warehouse at the same time after different lengths of time in the sequencing areas.

The sequencing process is thus made as efficient as possible. The space required for provision of the many different part variants is reduced and the walking distances for the sequencer are minimized. A "goods-to-person" concept is applied and, as a positive side effect, the potential danger between forklift truck and worker is reduced.

As used herein, a "sequencing level" is a level that has at least one sequencing area. Sequencing can optionally be done not only within a level, but can also be arranged on different levels, so that multiple levels of a rack can form sequencing levels.

The "floor level" and lowest level of the shelving system can preferably represent a sequencing level, but can alternatively or additionally form other levels of the rack. Sequencing can be carried out in a different level, for example, even should the high-bay warehouse not be placed at the general floor level of the hall, but begins, for example, further down, deeper in the floor and only part of the high-bay warehouse protrudes above the floor level of the hall. Also, the sequencing level can be other than the lowest level, but can be, for example, somewhere vertically in the middle or even the top level of the rack.

A "sequencing level", especially the ground level, need not be designed exclusively as a "sequencing level", but can also be designed as a "storage level". Thus, a level can form a sequencing level and a storage level at the same time, for example, the floor level.

As used herein, a "large load carrier" is understood to mean a loading unit with goods or material, in contrast to, for example, the "sequencing rack" load carrier.

In accordance with the present disclosure, it is preferable that each sequencing area contain at least one storage location for large load carriers, preferably at least two storage locations, in particular, three to ten storage locations for large load carriers, in particular six storage locations for large load carriers. Thus, the distances for the sequencer are not too long.

In accordance with the present disclosure, it is preferable that the lift or lifts be located along the longitudinal extent of the high-bay warehouse, inside the high-bay warehouse, preferably in the middle, so that the first sequencing area is located on one side of the lift and the second sequencing area is located on the other side of the lift.

The shelving system contains at least one, preferably two, transverse transfer carriages in each storage level for the horizontal transport of the large load carriers, wherein one transverse transfer carriage is set up for the transport of the large load carriers in the storage level on one side of the lift and the other transverse transfer carriage is set up for the transport of the large load carriers in the storage level on the other side of the lift. In a preferred version, there is only one transverse transfer carriage in each storage level and two transverse transfer carriages are used in a sequencing level or in a combined storage and sequencing level. In another variant, two transverse transfer carriages per level are provided in the pure storage levels to increase the throughput of large load carriers.

The high-bay warehouse is preferably implemented as a double rack, so that it contains a front high rack and a parallel rear high rack, wherein the control unit is set up to deliver the required large load carriers for sequencing orders from the storage levels to at least a first and a second front sequencing area in the sequencing level assigned to the front high rack and to deliver the respective required large load carriers for sequencing orders from the storage levels to at least a first and a second rear sequencing area in the sequencing level assigned to the rear high rack. The shelving system therefore also contains two or at least two sequencing areas on both sides, front and back, namely preferably a left and a right sequencing area in each case. The lift or lifts can be arranged, along the longitudinal direction of the racks, between the two sequencing areas of each side, i.e., at the front and back of the double rack.

The control unit is then preferably set up in such a way that the two sequencing areas for each of the two racks of the double rack are alternately processed by the sequencer and refilled via the lift and transverse transfer carriage. Thus, while goods from the large load carriers required for a sequencing order in a sequencing area in the sequencing level are placed in order in a sequencing rack, the required large load carriers for another sequencing order are thus delivered to the other sequencing area in the sequencing level.

In accordance with the present disclosure, it is preferable that the transverse transfer carriages be arranged between the front and rear high racks of the high-bay warehouse. The lifts can be arranged on the side next to a central aisle for the transverse transfer carriages. The lifts can thus be arranged next to the storage locations for large load carriers.

In accordance with the present disclosure, it is preferable that the shelving system contain at least two lifts, particularly preferably exactly two lifts. It is preferable to set up a lift for the vertical transport of the large load carriers of the front high rack and a lift for the vertical transport of the large load carriers of the rear high rack.

In accordance with the present disclosure, it is preferable that the shelving system contain four lifts or four transfer stations, wherein two lifts or transfer stations are arranged at least indirectly next to each other and are set up for the vertical transport of the large load carriers of the front high rack and two lifts or transfer stations are arranged at least indirectly next to each other and are set up for the vertical transport of the large load carriers of the rear high rack. Vertical transport can be carried out for transfer stations via a lift arranged in between. In particular, there can be four transfer stations and two lifts in the shelving system, wherein one lift is preferably arranged between two transfer stations in each case.

At the "transfer stations," it is preferable not to transport large load carriers outside the warehouse, but via the transfer stations, large load carriers are only moved within the warehouse, in particular to/from the lift or to/from the transverse transfer carriage.

In accordance with the present disclosure, it is preferable that the lifts or transfer stations and the control unit be set up in such a way that the large load carriers can be moved from one of the two lifts or transfer stations that are arranged next to each other, to the other of the two lifts or transfer stations that are arranged next to each other, i.e., they can change the respective place thereof, wherein the change of place for transfer stations can take place indirectly via a lift and/or after a change of level.

In accordance with the present disclosure, it is preferable that in each storage level, the front lifts or transfer stations be set up in such a way that the large load carriers change places in a first direction from one of the two lifts or transfer stations that are arranged next to each other, to the other of the two lifts or transfer stations that are arranged next to each other, and the rear lifts or transfer stations are set up in such a way that the large load carriers or transfer stations change places in the second direction, which is in the opposite direction to the first direction, so that the respective front lifts or transfer stations are set up for transport in the opposite direction to the respective rear lifts or transfer stations. As a result, all large load carriers can be transported to and from both sequencing areas (left and right) without interfering with each other.

In accordance with the present disclosure, it is preferable that the shelving system contain two lifts, wherein one lift is set up for the vertical transport of the large load carriers of the front high rack and one lift for the vertical transport of the large load carriers of the rear high rack.

In accordance with the present disclosure, it is particularly preferable that the shelving system contain two lifts and four transfer stations, wherein each of the two lifts is arranged between two transfer stations. In this embodiment, a high-bay storage system has two lifts, namely one lift for the front high rack and another lift for the rear high rack, and four transfer stations. This makes it possible to implement a one-way system as described above. The transport of the large load carriers can be carried out by a transverse transfer carriage to the transfer station and from there into the lift and, for example, on a different level, from the lift to another transfer station.

DRAWINGS

The present disclosure is described below on the basis of examples, with reference to the drawings.

DESCRIPTION

Figure 1:
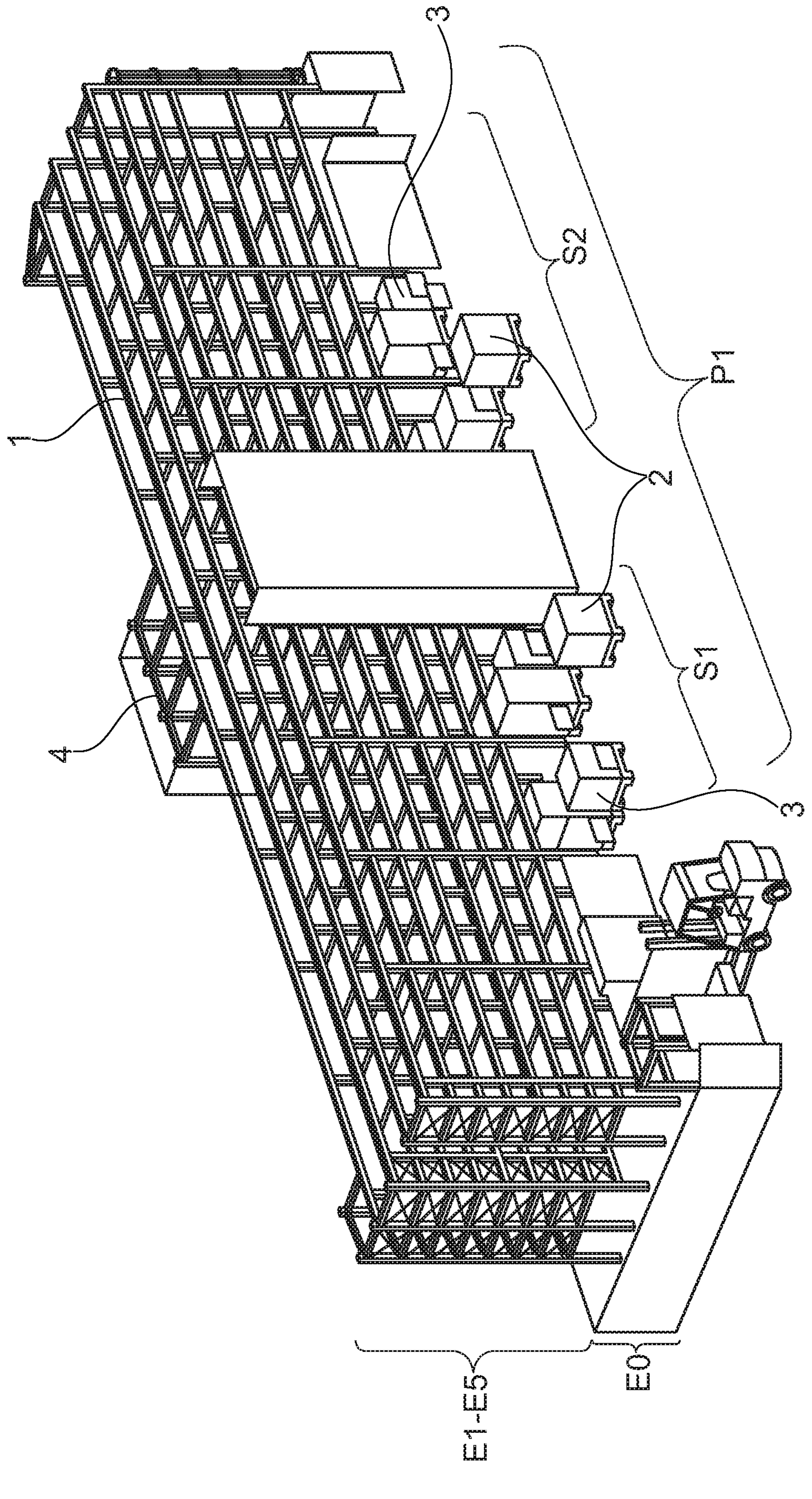
FIG. 1 illustrates a three-dimensional overview of contained components and areas of a possible implementation of a shelving system (also referred to as an automated picking warehouse "AGL"), in accordance with one or more embodiments of the present disclosure.

FIG. 1 illustrates a shelving system in accordance with one or more embodiments of the present disclosure.

As used herein, lifts 4 are also called "lifters."

As used herein, transverse transfer carriages 5 are also called "shuttles" and abbreviated to "QVW".

The sequencing areas for a sequencer, i.e., a worker, namely preferably the first sequencing area S1 and the second sequencing area S2, are also collectively called a "picking point" or a "SEQ bay" or even a picking station.

In accordance with one or more embodiments of the present disclosure, the core of a shelving system is a high-bay warehouse 1 with automated horizontal and vertical transport components, namely a lift 4 and a transverse transfer carriage 5, for transporting the required material, namely the required large load carriers 3, of the next sequencing order to the sequencing area S1, S2. In the lowest level E0 there are at least two sequencing areas S1, S2 to the left and right of the lift 4. A plurality of areas can be handled alternately by one or more sequencers. A plurality of areas can also be combined into a common area for a short time. The areas can also come from more than one high rack, see FIG. 4. While at least one sequencer in one area, for example, S1, sequences the actual sequencing order, in at least another area, for example, S2, the material from the previous order is stored back into the warehouse and the material for the next sequencing order is prepared. The sequencer is provided with only the material it needs for its sequencing order. At the end of its sequencing order, the sequencer can change to another sequencing area that has been prepared for the next order. What is associated with sequencing in this text can also be used for order picking.

Figure 2:
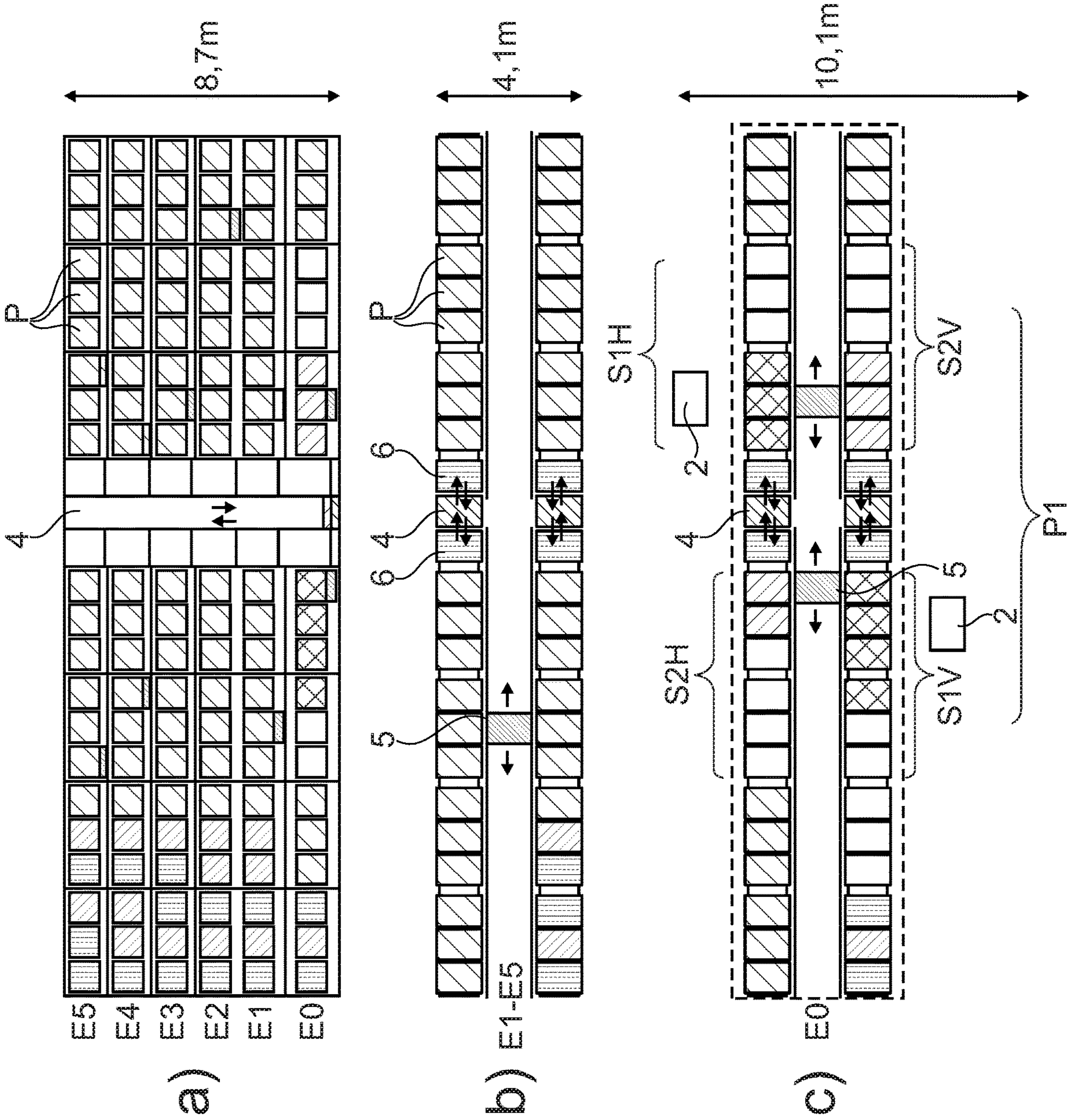
FIG. 2 illustrates schematically an overview of the components and areas in a shelving system, in accordance with one or more embodiments of the present disclosure.

FIG. 2 illustrates schematically an overview of the components and areas in a shelving system in accordance with one or more embodiments of the present disclosure, namely at the top at a) a side view, in the middle at b) a top view of the storage levels E1-E5, at the bottom at c) a top view of a level with sequencing areas, namely here the floor level, E0.

Full and empty spaces for large load carriers 3 can be replaced by a pre-zone. Any number of sequencing areas S1, S2, can also be used from multiple high-bay warehouses 1 in a network. FIG. 2 illustrates two front sequencing areas S1V and S2V, which together can form a first pick station P1, and two rear sequencing areas S1H and S2H.

As used herein, "pre-zone" means storage locations for GLTs 3, for example, storage and retrieval locations on the left-hand edge of the rack for supplying the rack via a forklift and replenished GLTs 3 or for removing empty GLTS 3 from the rack.

In the AGL shown, main storage locations for GLTs are also shown in level E0. In this respect, the sequencing level E0 is not only a sequencing level, but also a storage level. The level E0 is thus a level in which there are also sequencing areas, preferably in addition to other areas.

The version shown with two transverse transfer carriages 5 is the preferred variant for level E0 or generally for level(s) with sequencing areas. For storage levels, such as E1-E5, the preferred more cost-effective variant is only one transverse transfer carriage 5 per level. However, a variant with two transverse transfer carriages 5 per storage level E1-E5 would also be advantageous and enables faster collection or delivery of the goods.

Figure 3:
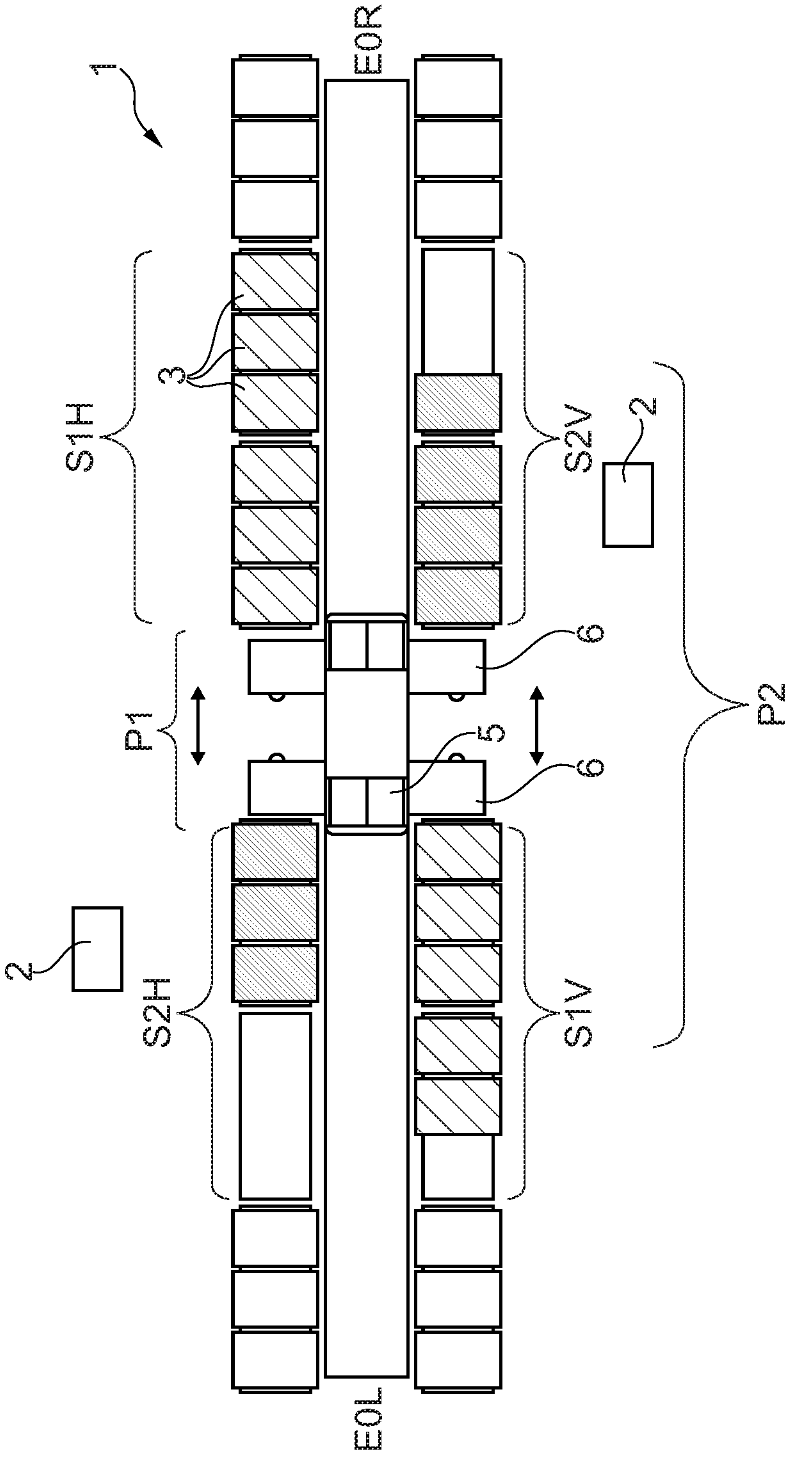
FIG. 3 illustrates schematically a sequence of sequencing orders one after the other.

FIG. 3 schematically illustrates a sequence of sequencing orders that are processed one after the other.

1. A respective employee processes the active sequencing order on both picking stations, for example, front, right, in S2V and rear, left, in S1H, i.e., diagonally offset from each other on both sides of the rack.
2. In the meantime, on the other side of the respective picking station, the old sequencing order can be put back into the automated storage system and all part variants can be made available from the automatic storage system for the next sequencing order.
3. Should it be necessary, a load unit can also be replaced in the active sequencing order.
4. After completing the active sequencing order, the employee can change sides within the picking station, for example, in P1 from S2V to S1V, and can start sequencing the next order.

Figure 4:
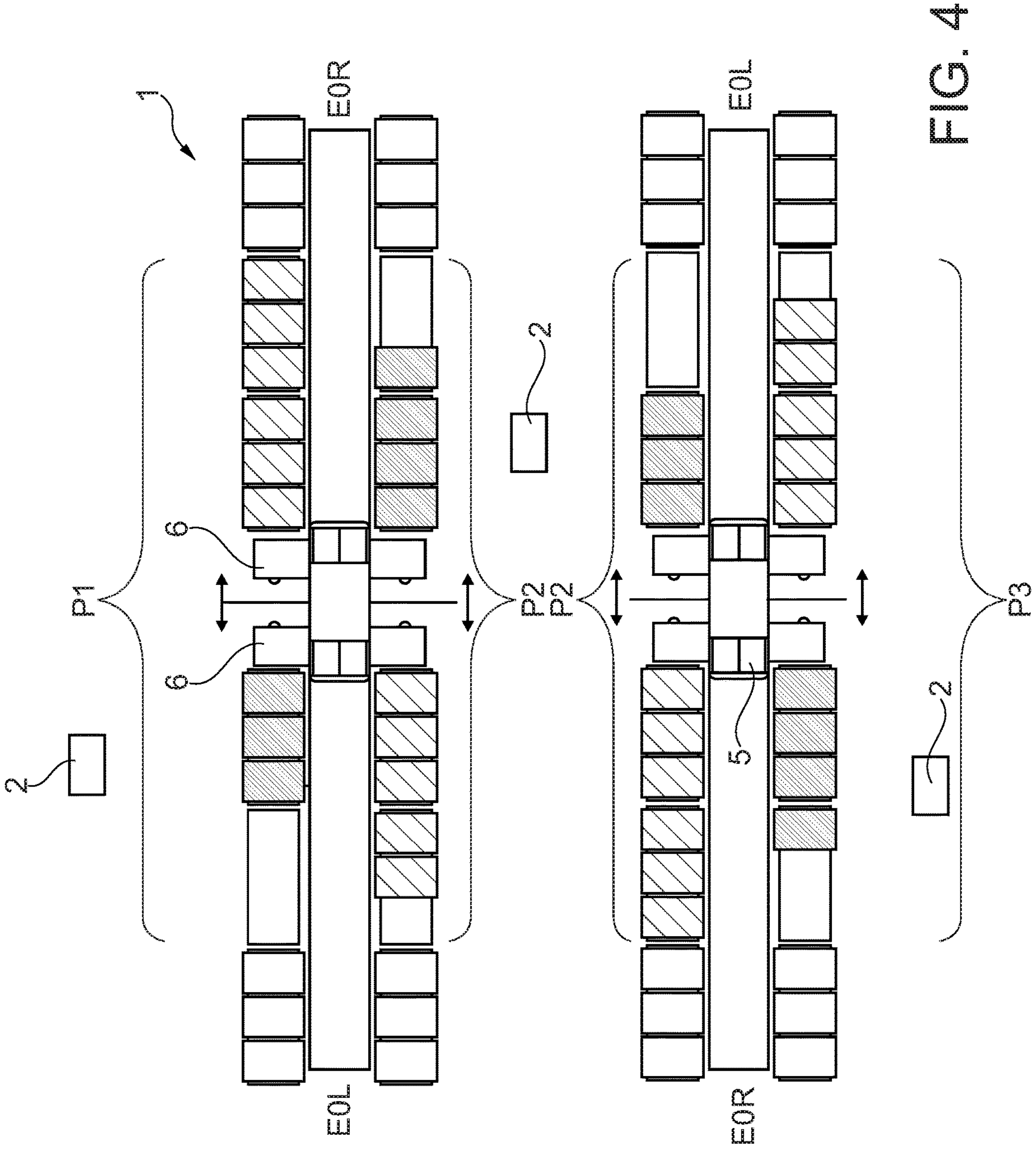
FIG. 4 illustrates schematically several AGL's used in combination.

FIG. 4 schematically illustrates that several AGL's, i.e., automated picking warehouses, i.e., shelving systems, can be used in combination.

For example, the picking station 2 workstation can contain the sequencing areas of two different high racks, thus preferably a first and a second sequencing area S1, S2 of each of the two high-bay warehouses.

The system is very flexible and easy to adapt. The system can be adapted depending on the required throughput, storage capacity and available hall size. The storage levels E1-E5 are connected to at least one lift 4. There is no need to use plant-specific storage technology, but a conventional pallet rack can be used. It is not necessary to adapt or connect the system technology to the shelving system. The length and height of the rows of shelves is freely scalable. Depending on the required throughput, a correspond number of mechanical components (lifts 4 and transverse transfer carriages 5) must also be used. The load handling device must also be selected depending on the type of goods (KLT/GLT) to be moved. These can be implemented as telescopic forks, chain conveyors, roller conveyors and belt conveyors or similar. It is also possible to use system pallets. Depending on the design, the transverse transfer carriages 5 could also change levels together with the load carriers 3, for example, as a kind of mobile undercarriage for large load carriers. In a preferred variant, however, the transverse transfer carriages are permanently assigned to the levels and the large load carriers are only transported/moved by the transverse transfer carriage to the transfer stations, and only the large load carriers change levels.

The sequencing of small load carriers and individual parts from the provided load units in sequencing containers, i.e., sequencing racks 2, can be carried out manually or automatically, for example, with a robot arm. This sequencing container 2 can be transported to the assembly line manually (for example, lifting fork, trolley), semi-automatically (for example, forklift) or fully automatically (for example, FTS). A sequencing container or rack 2 can contain part variants of one or more part families for one or more production parts.

The system does not have a pre-zone for the provision of the loading units. The lowest storage level E0 can be used for this purpose. The system is primarily designed for the picking of small load carriers, but also for the sequencing of parts. Several systems of this type can also be arranged next to each other in a group and further connected via conveyor technology in order to optimize the supply area and keep it flexible. Furthermore, at least one automated high-bay warehouse, which serves as the main warehouse, can be installed in sequence with or in series upstream of this system.

Figure 5:
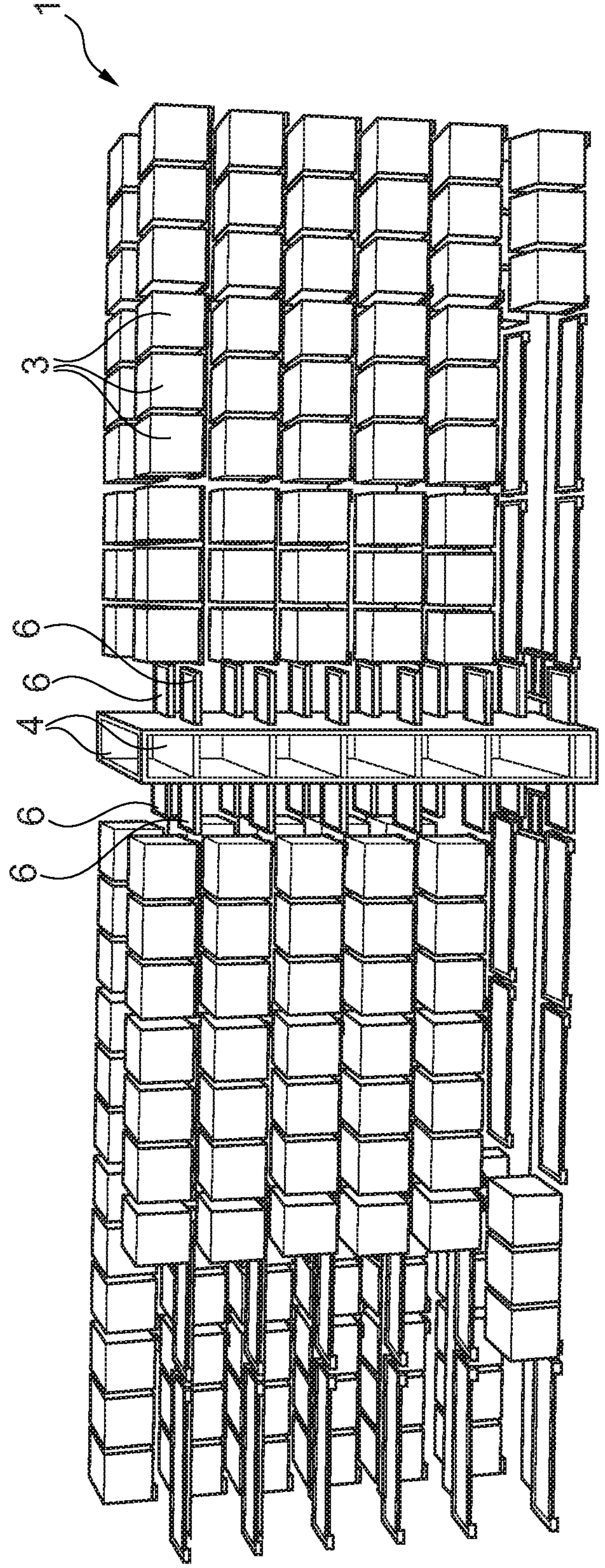
FIG. 5 illustrates schematically an overall view of the simulation model.

FIG. 5 schematically illustrates an overall view of a simulation model of a rack according to the invention.

Figure 6:
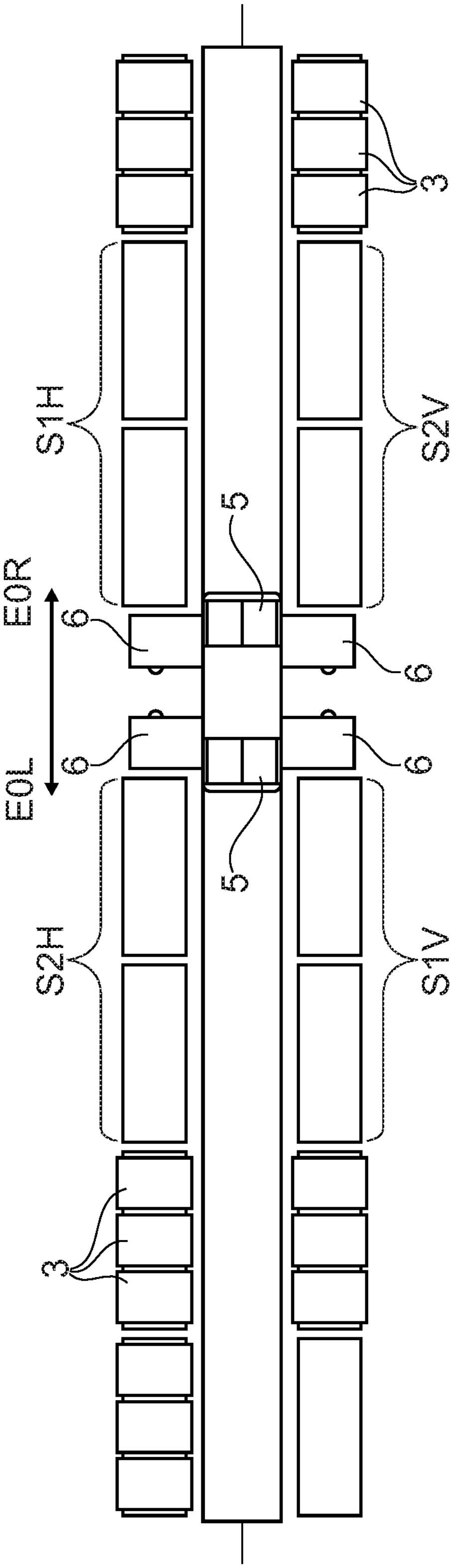
FIG. 6 illustrates schematically a subnetwork E0L and E0R.

FIG. 6 schematically illustrates a sub-network E0L and E0R, i.e., the level 0-left E0L and level 0-right E0R, i.e., the floor level, of a shelving system.

The two subnetworks "Level 0-Left" (E0L) and "Level 0-Right" (EOR), shown in FIG. 6 as subnetworks E0L and E0R, are very similar. Both have at least one transverse transfer carriage 5 and at least two transfer stations. The rows of racks can be placed on both sides of the transverse transfer carriage 5. In the middle between the rows of racks is the QVW track for at least one transverse transfer carriage 5. At least one QVW can be used for E0L and E0R together, or, to increase GLT throughput, as shown in FIG. 2, one QVW can be used for E0L and another QVW for E0R, i.e., preferably two QVWs for the sequencing level E0.

The storage locations closest to the transfer stations 6 will be used as sequencing places. Both subnetworks combine these sequencing places into two sequencing areas S1, S2 each. The difference between the two networks is that, for example, on the front left in the E0L, additional storage locations are classified as storage and retrieval locations. However, several of these storage locations can also be arranged in different positions. Ideally, these are placed as close as possible to the sequencing area S1, S2 at a distance from a main storage station. The distance from a main storage station is preferable in order to separate the work areas of the workers and forklifts for safety reasons. These storage and retrieval locations can also be replaced by a fully automatic pre-zone, whereby the goods are placed for example, by a lifter 4 on a transfer station 6 in the corresponding level and from there are further stored by a QVW 5.

Figure 7:
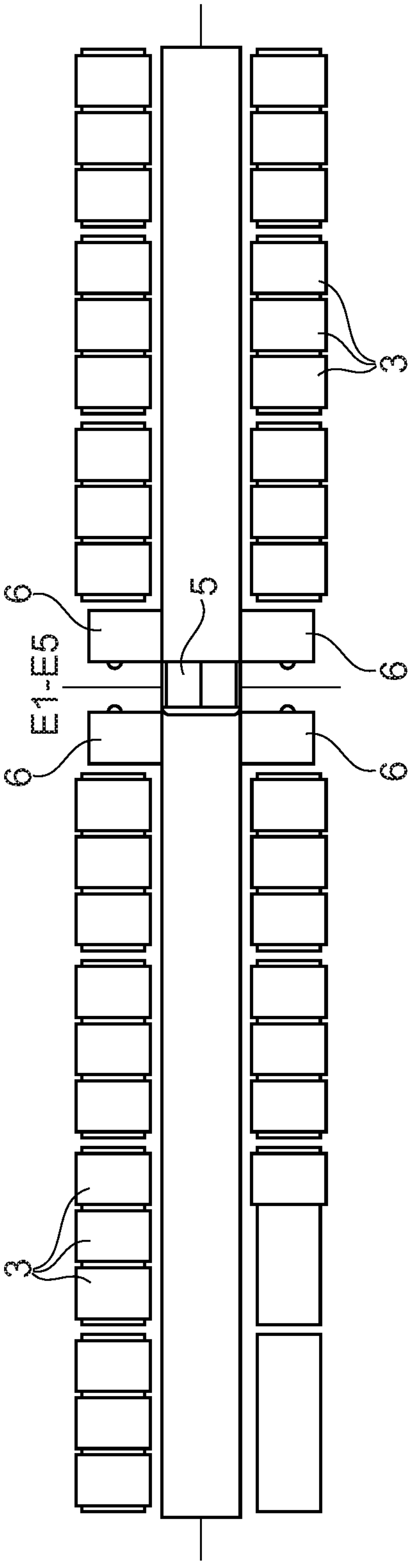
FIG. 7 illustrates schematically a subnetwork E1-E5.

FIG. 7 schematically illustrates a subnetwork E1-E5, i.e., the levels 1-5.

The sub-network "Levels 1-5" E1-E5 each consist of at least one transverse transfer carriage 5, for example, four transfer stations 6 and laterally arranged rows of racks. In the middle is the QVW track for the at least one transverse transfer carriage 5. The storage locations on the left front are ideally reserved for storage and retrieval locations. They must be at least the same distance from lift 4 as the retrieval locations in E0L. Here, too, the pre-zone described above can replace the storage and retrieval locations.

In the following and in FIG. 8, processes and their strategies in the high-bay warehouse are described. The following processes are usually handled in the same order for each order. However, since the system can have four sequencing areas S1V, S1H, S2V, S2H and thus four orders can be processed in parallel, all processes can be carried out simultaneously, depending on the progress of the respective order.

Additional Detailed Explanation Regarding the Software Program:

The starting point for the first process "Create and assign orders" is the input data from past working days or current data provided by the company.

Create and Assign Orders:

The first step is to create sequencing orders from the sequence data. Each order subsequently means a full sequencing rack 2. The process is illustrated in FIG. 8 Order Creation and Assignment. In this order creation, each order is given its own name, which can consist of the name of the respective sequencing scope and a sequential sequence number. Under each order name, the sequence of parts, the quantity of parts, and the total number of variants is noted. The number of variants indicates how many locations are required in the sequencing area to enable completion of the order. The number of variants refers to the existing vehicle variants in the production line for which the sequencing rack is filled, for example, with different variants of steering wheels-a separate large load carrier must be provided in the sequencing area for each of these variants of steering wheels.

The table "Order S" in the diagram is required for later sequencing and specifies the sequence and quantity of part withdrawal. The table "Order B" in the diagram is required for the subsequent provision of the large load carriers 3 (GLTs) and indicates which GLTs and how many parts from them are required for the order in total.

For the sequencing of an order, the required variants for an order must now be provided in a sequencing area. For this purpose, the required variants for an order are searched for in the stock of the automatic picking warehouse (AGL), i.e., the shelving system, and are reserved for this order. At the same time, when making a reservation, care should be taken to ensure that the filling quantity of the GLT is sufficient for this one order. If this is not the case, the next oldest GLT of the same variant should also be provided. This special case is called double provisioning and increases the number of variants for this order by one, as an additional storage location is required. Should all GLTs be reserved for an order, that order could be added to a transport pool. All the necessary information for the system is temporarily stored under the order names in order to find the reserved GLTs again later. The possible parameter "transport pool number" can be selected arbitrarily and specifies how many such orders should be in the transport pool.

For example, the transport pool number is six. As a result, six orders with their reserved GLTs are in the transport pool, waiting to be assigned to a free sequencing area. When assigned, the transport pool could pass its information about this order to the system and delete it to make room for a new order.

Normally, the oldest order in the transport pool is always assigned to a free sequencing area. However, should the number of variants be greater than the number of free places in the sequencing area, this order can be skipped. After that, the number of variants of the next oldest order in the transport pool is always checked. The first order with a sufficiently small number of variants could be assigned. The next time an order is assigned, the check of the number of variants starts again with the oldest order. The task of the transport pool would be to ensure that a suitable order for an assignment is available at all times in order to prevent vacancies in sequencing areas.

For optimal worker utilization, one sequencing area should be provided at a time, while the adjacent sequencing area is sequenced by a worker and vice versa. A free sequencing area with for example, six storage locations would have six free spaces. However, it is possible that there are many orders with a number of variants greater than six. Therefore, it is envisaged that an order for a sequencing area may be extended to the adjacent sequencing area. This means that there are not only six places available for an order, but twelve places per side. In order to maintain the aforementioned alternating operation of the adjacent sequencing areas, it should be ensured that there is always room for two orders on the twelve places at all times. This would be possible at any time with a correctly selected variant limit. The variant limit and the three ways to handle an order are explained in the following sub-points.

Figure 8:
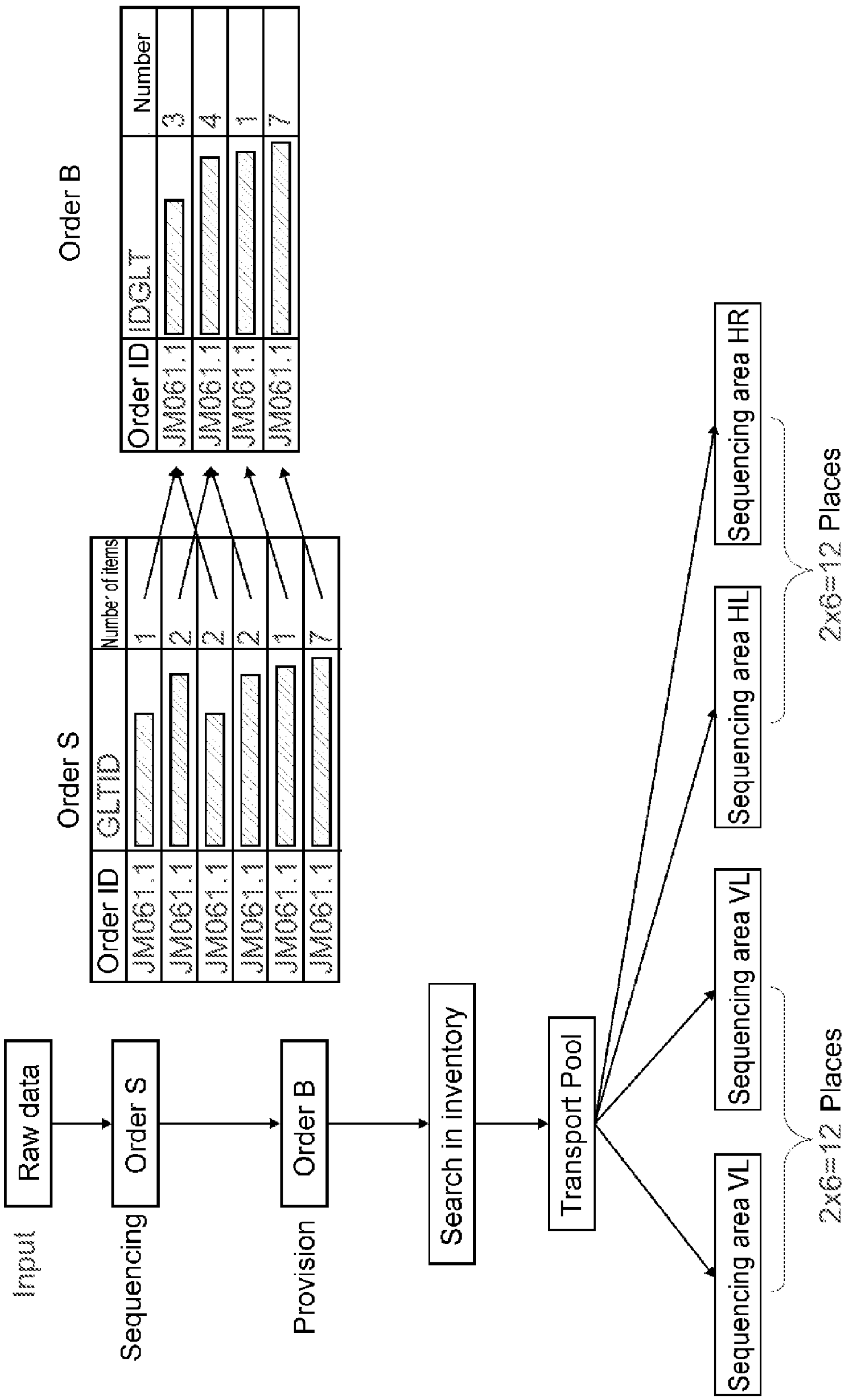
FIG. 8 illustrates schematically an order creation and assignment.

FIG. 8 schematically illustrates an order creation and assignment.

Should the number of variants of an order exceed the variant limit, then the variants that are above could still be reserved for this order, but instead of being listed with the other GLTs in the transport pool, they could be temporarily stored in an overhang list under the appropriate order name. How this type of orders could be dealt with further is described in more detail in the following point on the basis of the third possibility.

The variant limit would have the effect that orders with an arbitrarily high number of variants could be processed and yet there would always be enough space for a second order on the total of twelve possible sequencing places, for example.

The three ways in which sequencing orders could be handled, depending on their number of variants, are now briefly explained. It is assumed that, for example, an order with a variant number of three is already being sequenced on the left sequencing area and the right sequencing area has just become free and is waiting for an order assignment. First of all, the free sequencing places and thus the maximum permissible number of variants that the new order may have would have to be determined. In this example, we are talking about sequencing areas with six sequencing places each. For this example, should we subtract three occupied places from a total of twelve possible, we get nine free places. If the number of variants is greater than the number of available free places, the order in the transport pool could be skipped as mentioned above and would only be considered again during the next order assignment.

1st Option—Number of variants less than six

All GLTs can be deployed on the right sequencing area.

2nd Option—Number of variants greater than six but less than the variant limit

The first six GLTs could be deployed on the right-hand sequencing area.

The rest can be deployed on an adjacent sequencing area.

3rd Option—Number of variants greater than the variant limit

Based on an example where an order has a variant number of ten and there is a variant limit of eight, the first six GLTs could be deployed on the right sequencing area. An additional two GLTs can be deployed on the adjacent left sequencing area. The remaining two GLTs could be noted in the overhang list and can wait. Once a GLT that has already been deployed is no longer needed, it can be removed from the sequencing area and the ninth GLT from the overhang list can be deployed. This procedure is repeated until all GLTs from this order would have been provided from the overhang list.

Before going into more detail about the individual transport routes, the overarching transport strategies should be briefly described. Since many transports are carried out at the same time and in all directions, simple and basic traffic rules are useful to counteract possible traffic jams or even blockages and to carry out the transports as efficiently as possible.

Figure 9:
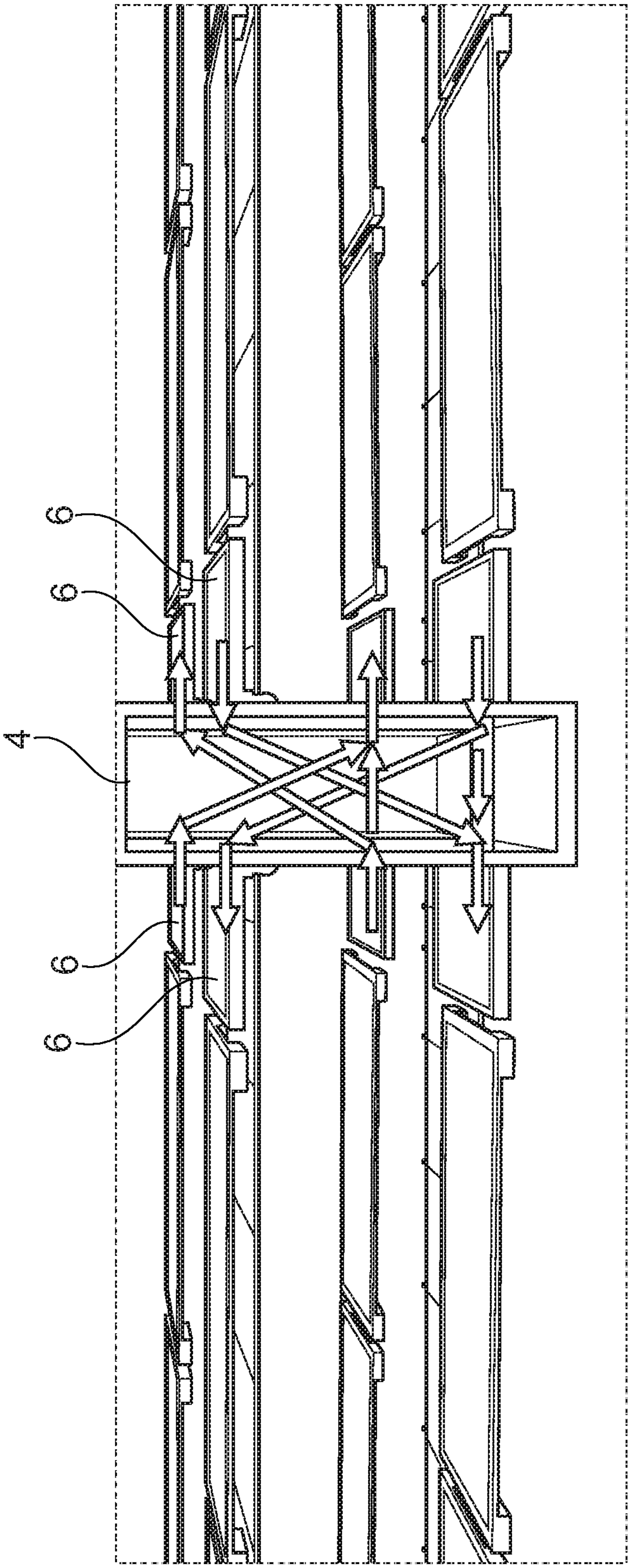
FIG. 9 illustrates schematically transport routes between the levels.

FIG. 9 schematically illustrates the transport routes between the levels.

Figure 10:
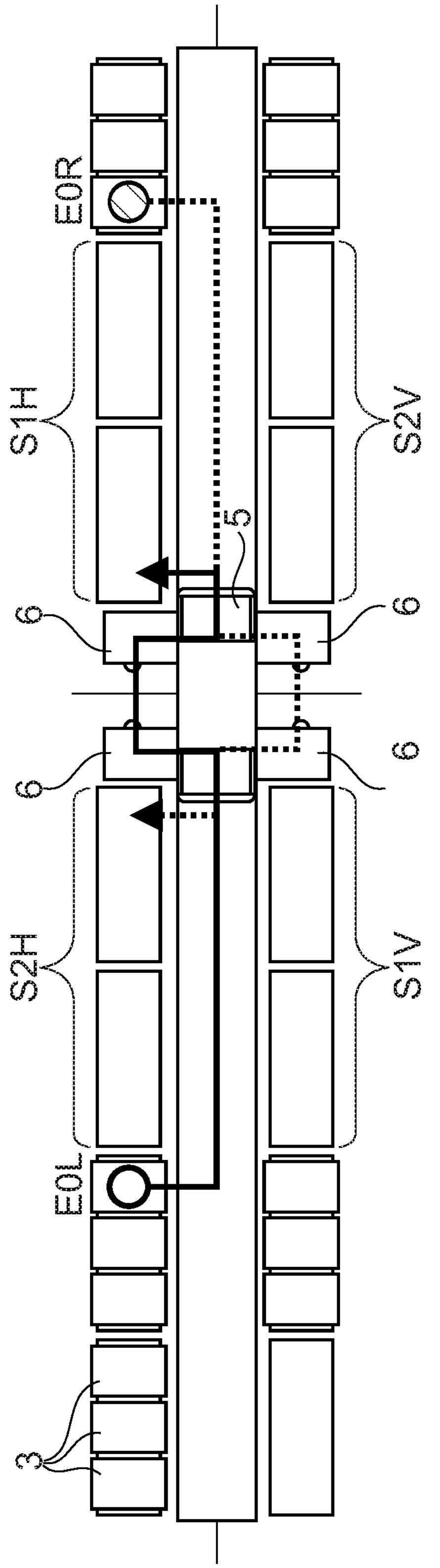
FIG. 10 illustrates schematically transport routes between E0L and E0R.

FIG. 10 schematically illustrates the transport distances between E0L and E0R.

The most important measure is the introduction of a one-way system. There are at least two transfer stations in each level, wherein at least one is defined for receiving and at least one for delivering GLTs. The sketch given in FIG. 10 serves as an example. In order to transport GLTs to the sequencing area in E0R, they could be delivered to the “rear left transfer station” (line). For transport to E0L, the GLTs could be delivered to the “front right transfer station” (other line). Similarly, the return transport from E0R could arrive at the “front left transfer station” and the return transport from E0L could arrive the “rear right transfer station.” In the case of a transport from E0R to E0L or vice versa, as can be seen in FIG. 10, transport routes between E0L and E0R, the lift platform could form a connection with the help of the “right transfer stations” and the “left transfer stations.” The one-way system helps to prevent two GLTs from coming face-to-face with each other and trying to move in opposite directions.

With this one-way system, a lot of administrative work can be saved for the individual transports, as no transport route would have to be closed in one direction or the other. This also allows for small queues in the respective direction, which could have an optimal effect on the utilization of all devices. Each transverse transfer carriage can deliver its load to a transfer station without the risk of an oncoming GLT. If, for example, there are many transports to E0L, then the first GLT could still be served by the transverse transfer carriage in E0L. However, the following ones could wait on the “Front Left Transfer Station” in Level 0, on the lift at Level 0 and on the “Front Right Transfer Stations” on Levels 1-5 until their predecessor units become available. As can be seen in FIG. 9 transport routes between the levels, the transport routes at the rear of the plant could run exactly laterally reversed. This creates a roundabout in a clockwise direction and could maintain the principle of a one-way system for transports between E0L and E0R.

Each lift could have its own waiting list in which the GLTs can register for a transport. Each transverse transfer carriage could have a storage waiting list and a removal waiting list. The GLTs in the storage waiting list want to move from a transfer station to a storage location, and the GLTs in the removal waiting list want to move from a storage location to another storage location or to a transfer station. In the case of these three types of lists, the oldest transport could always be chosen for removal, wherein there could be a few exceptions. The transverse transfer carriages could first work through the storage waiting list and only then take care of the removal ones. This could prevent blockages of the lift and thus heavy traffic jams in level 0. Furthermore, the lift could prefer the transport of a GLT should the lift be already at the level of the GLT. This could reduce empty trips and would be particularly helpful in level 0 for minimising congestion at this level.

Figure 11:
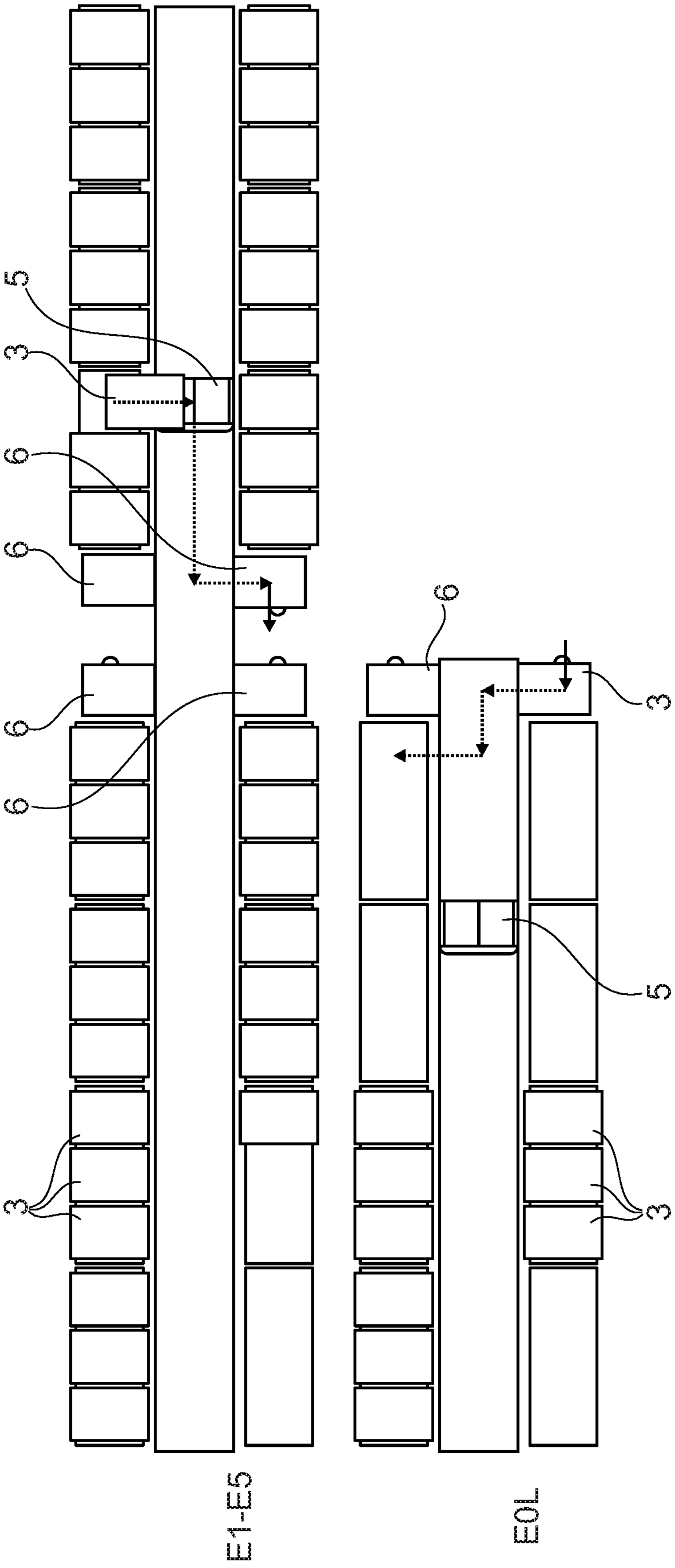
FIG. 11 illustrates schematically a deployment of the GLTs.

FIG. 11 schematically illustrates a deployment of the GLT, wherein the path of the GLT is shown as an arrow.

Once an order has been assigned to a sequencing area, the deployment of the GLTs could begin with the GLT reserved for it in the high-bay warehouse. The GLTs could receive their target sequencing area and set off with this information. They could register in the removal waiting list of transverse transfer carriage 5 on their level and can wait for it to be at their position. The transverse transfer carriage 5 picks up the GLT and takes it to a transfer station that leads to the target sequencing area. After the GLT has been transferred at the transfer station, the transverse transfer carriage could take the next transport from its waiting lists and set off. In the meantime, the GLT could join the waiting list of the adjacent lift. The GLT could be picked up by the lift and transported towards level 0. The lift delivers the GLT to one of the transfer stations in level 0 and could move to its next position in its waiting list. The GLT could register itself in the storage waiting list for the transverse transfer carriage in level 0 and wait for its turn. Once the transverse transfer carriage is at the transfer station, it picks up the GLT and transports it, for example, to the nearest free space in the target sequencing area E0L.

Once at least one GLT of an order is deployed, the parts could be started to be removed from the deployed GLT and placed in the sequencing rack.

For orders where the number of variants exceeds the variant limit, the GLTs can be exchanged during sequencing, as described above under "Three Options for Order Handling". At the end of a sequencing, the worker can go from the left to the right or vice versa to sequence the next order.

Figure 12:
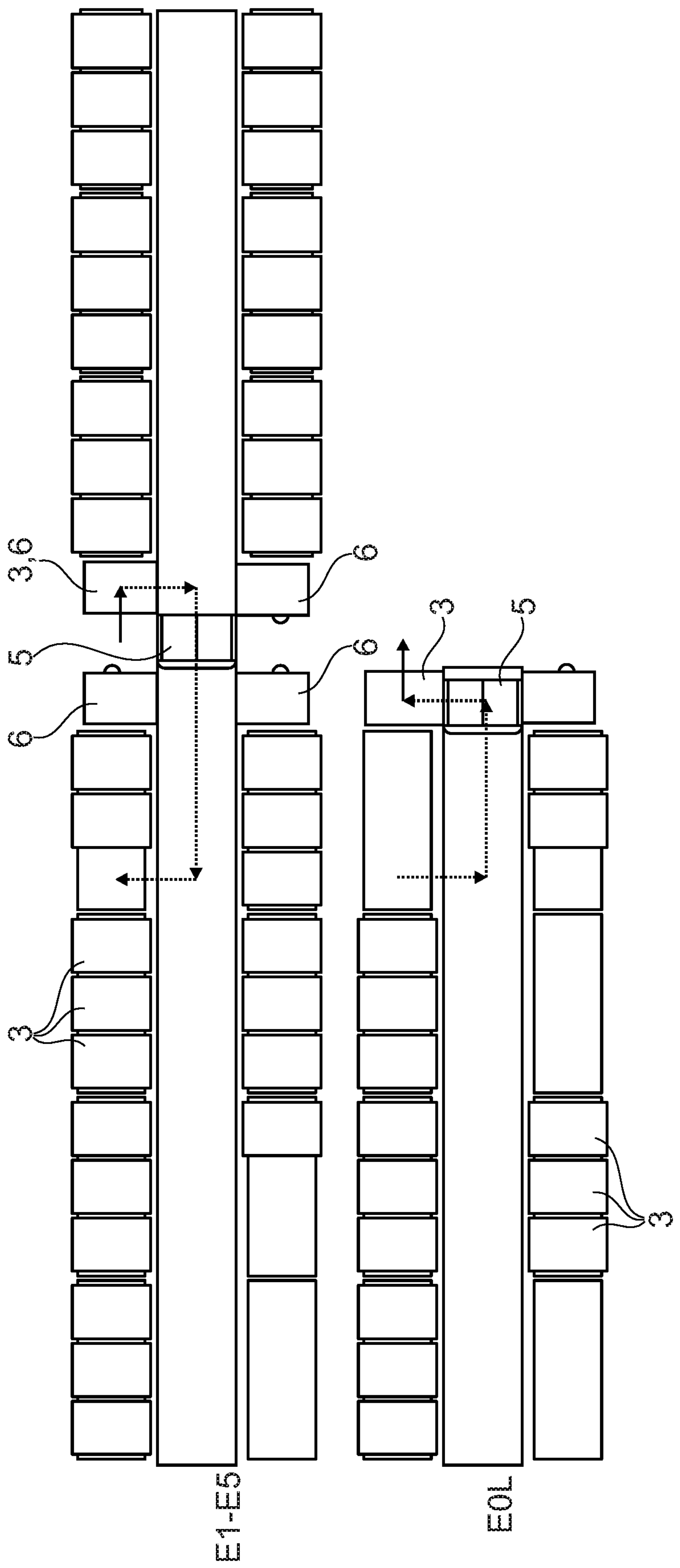
FIG. 12 illustrates schematically a return transport of the GLTs.

FIG. 12 schematically illustrates a return transport of the GLTs.

The return transport for a GLT can be released once no further part from this GLT is needed or it is empty. These released GLTs could be removed from the sequencing areas even though the worker has not yet completed the sequencing process for the order. A free main storage location could be found for it, and it could be transported back there or stored as empty.

For all the cases just mentioned, the process of the return transport could be the same. The GLT could re-enter the removal waiting list of the transverse transfer carriage in level 0 and wait for it. Depending on the case at hand, this could take it to a retrieval location, main storage location or a transfer station in level 0. If it arrives at a transfer station, the GLT could register again in the waiting list for the lift, which could transport it to the level where, for example, its assigned main storage location or retrieval location is located. After the transfer from the lift to the transfer station, the GLT could register itself in the storage waiting list of the transverse transfer carriage in this level. The GLT can wait for its turn and could then be transported to its place or main storage location (in FIG. 12, for example, the third place on the left in one of the levels E1-E5) where it waits for its next call.

Overall, therefore, the most important process steps that can be supported by a shelving system in accordance with one or more embodiments of the present disclosure are:

A worker/sequencer takes the desired material from the sorted loading units/crates/component crates/pallet boxes, referred herein to in the text as large load carriers (=GLT) 3, which are made available to the worker by the AGL in the sequencing level, here the lowest level E0 of the high rack 1 of the AGL, depending on the specific sequencing order (see for example, FIG. 2) and places them in a sequencing rack 2, which is then brought to the production line to install the parts according to the order (variants) of the vehicle bodies arranged on the production line (not shown). The term "large load carrier" used here in the text does not restrict the size of the components/materials contained in the load carrier and required for the respective sequencing. This includes all components that are suitable for sequencing in a vehicle production.

The worker/sequencer is supported by the AGL in that the AGL, as shown in FIG. 2, has two sequencing areas S1V, S2V, S1H, S2H on the lowest level on each side of the AGL, to the left of the lift for example, S2H and to the right of the lift for example, S1H on one side. Two sequencing areas, such as S1H and S2H, form a picking station, for example, P2 here. It is the same on the opposite side of the AGL. For this purpose, the AGL provides six storage locations P for GLTs in each sequencing area S1V, S2V, S1H, S2H, which are automatically populated by the AGL with the required component boxes or GLTS 3 according to the respective order to be sequenced. Six storage spaces P or the possibility to provide a maximum of six component boxes/GLTs 3 per sequencing area is the preferred, most optimal variant, based on the time used by the worker who has to go from box to box, on space consumption, etc. In the sequencing area S1H, only three GLTs 3 are provided for the current sequencing order, leaving three places P free. The sequencing area S2H is still in progress, four storage locations P are currently still free, and two storage locations P already have a GLT 3, wherein the material change is still in progress. The GLTs 3 are moved on the AGL via the lift 4—for transport up and down—and left and right in the rack by the QVW 5. The QVW 5 transports the GLTs 3 in E0 to the correct position in the respective sequencing area, wherein for this purpose the QVW simply positions/pushes the GLT 3 from the inside to the outside or the GLT 3 transported in the middle between the two rows of shelves to the corresponding position in the respective sequencing area is moved to the outside or under the rows of shelves—to the correct sequencing area S1V, S2V, S1H, S2H. In this way, the worker/sequencer (shown between the sequencing rack 2 and the AGL) is not hindered in the sequencing during the exchange of GLTs 3 (because a new sequencing order with other components is pending or a GLT becomes empty). For example, as shown in FIG. 2, the worker/sequencer can complete the order in the sequencing area S1H while the sequencing area S2H is being prepared for the next sequencing order. Forklifts or other people approaching the sequencing area are also not obstructed. On the other side of the AGL, another worker/sequencer is depicted that is currently processing an assigned order in the sequencing area S1V and takes the parts/material available for this sequencing order from the GLTS 3 shown from the four GLTs 3 provided by the AGL and places them in the sequencing rack 2. During this the sequencing area S2V for this worker/sequencer is automatically prepared by the AGL for the next sequencing order.

The picking of parts/small load carriers from the GLTs 3 for filling the sequencing rack/container 2 can be done not only manually, by workers, but also automatically, via robots.

It is preferable to use a "one-way transport strategy" for GLTs 3, as described above.

LIST OF REFERENCE SYMBOLS

1 High-bay warehouse
2 Sequencing rack
3 Large load carriers
4 Lift
5 Transverse transfer carriage
6 Transfer station
E0 Sequencing level
E0L Sequencing level on the left
E0R Sequencing level on the right
E1, E2, E3, E4, E5 Storage Levels
P Storage location
P1 Picking station 1
P2 Picking station 2
S1 First sequencing area
S2 Second sequencing area
S1V First front sequencing area
S2V Second front sequencing area
S1H First rear sequencing area
S2H Second rear sequencing area

What is claimed is:

1. A shelving system for sequencing goods, the shelving system comprising:

a high-bay warehouse with at least one sequencing level at a floor level and a plurality of storage levels operable to store large load carriers at storage locations thereof during normal operation of the shelving system, the large load carriers being operable to store goods of one type, the high-bay warehouse including a double rack having a front high rack and a rear high rack arranged parallel to the front high rack;

at least one lift operable to facilitate vertical transport of the large load carriers, the at least one lift being arranged in the high-bay warehouse;

at least one transverse transfer carriage in each storage level for a horizontal transport of the large load carriers;

a control unit operable to process sequencing orders for a transfer of large load carriers in a sequencing order from the storage levels to at least one second sequencing area in the at least one sequencing level, while goods from large load carriers for another sequencing order are placed in a first sequencing area in the at least one sequencing level in a sequencing rack of the first sequencing area and vice versa, so that the large load carriers for the sequencing order are delivered from the storage levels to the first sequencing area in the at least one sequencing level, while goods from the large load carriers for the other sequencing order are placed in order in the at least one second sequencing area in the sequencing level in a sequencing rack of the at least one second sequencing area, wherein the control unit is operable to deliver the large load carriers for sequencing orders from the storage levels to: at least a first front sequencing area and a second front sequencing area in the at least one sequencing level which are assigned to the front high rack, and at least a first rear sequencing area and a second rear sequencing area in the at least one sequencing level which are assigned to the rear high rack; and a plurality of lifts or transfer stations that include a first lift or transfer station and a second lift or transfer station arranged at least indirectly adjacent to each other for the vertical transport of the large load carriers of the front high rack, and a third lift or transfer station and a fourth lift or transfer station arranged at least indirectly adjacent to each other for the vertical transport of the large load carriers of the rear high rack, wherein the plurality of lifts or transfer stations and the control unit are configured to move the large load carriers from one of the first lift or transfer station and the second lift or transfer station to the other of the first lift or transfer station and the second lift or transfer station, and from one of the third lift or transfer station and the fourth lift or transfer station to the other of the third lift or transfer station and the fourth lift or transfer station, thereby changing a position of the large load carriers, wherein, at each storage level, the first lift or transfer station and the second lift or transfer station are configured to change the positions of the large load carriers in a first direction, and the third lift or transfer station and the fourth lift or transfer station are configured to change the positions of the large load carriers in a second direction, the second direction being opposite to the first direction, so that the lifts or transfer stations associated with the front high rack are configured for transport in a direction opposite to a direction of transport of the lifts or transfer stations associated with the rear high rack, and wherein the at least one lift is arranged in the high-bay warehouse along a longitudinal direction of the high-bay warehouse so that the first sequencing area is arranged on one side of the at least one lift and the second sequencing area is arranged on the other side of the at least one lift.

2. The shelving system of claim 1, wherein each sequencing area contains about three to ten storage locations for large load carriers.

3. The shelving system of claim 2, wherein each sequencing area contains six storage locations for large load carriers.

4. The shelving system of claim 1, wherein the at least one transverse transfer carriage comprises a first transverse transfer carriage and a second transverse transfer carriage respectively operable for the horizontal transport of the large load carriers in each sequencing level and/or in each storage level.

5. The shelving system of claim 4, wherein:

the first transverse transfer carriage is arranged on one side of the at least one lift, and the second transverse transfer carriage is arranged on the other side of the at least one lift.

6. The shelving system of claim 4, wherein:

exactly one transverse transfer carriage is arranged in each storage level other than the at least one sequencing level, and two transverse transfer carriages are arranged in the at least one sequencing level.

7. The shelving system of claim 1, wherein the transverse transfer carriages are arranged between the front high rack and the rear high rack.

8. The shelving system of claim 7, wherein the at least one lift is arranged adjacent to a central aisle for the transverse transfer carriages and adjacent to storage locations for the large load carriers.

9. The shelving system of claim 1, wherein the at least one sequencing level is also configured as one of the plurality of storage levels.

10. The shelving system of claim 1, wherein the at least one lift is arranged in a middle region of the high-bay warehouse along the longitudinal direction of the high-bay warehouse.

11. The shelving system of claim 1, wherein:

at least two transfer stations are provided in each storage level, at least one of the at least two transfer stations is configured to receive the large load carriers, and at least one other of the at least two transfer stations is configured to deliver the large load carriers.

12. The shelving system of claim 1, wherein the at least one transverse transfer carriage in each storage level is permanently assigned to the respective storage level, and only the large load carriers are transported between the storage levels.

13. The shelving system of claim 1, further comprising a load handling device selected from the group consisting of a telescopic fork, a chain conveyor, a roller conveyor, and a belt conveyor.

14. The shelving system of claim 1, further comprising a robot arm configured to remove goods from the large load carriers and place the goods in the sequencing rack.

15. The shelving system of claim 1, further comprising another shelving system arranged adjacent to the shelving system and connected to the shelving system by conveyor technology.

16. The shelving system of claim 1, further comprising a second high- bay warehouse, and a picking station comprising a first sequencing area and a second sequencing area of each of the high-bay warehouse and the second high-bay warehouse.

17. The shelving system of claim 1, wherein:

the at least one lift comprises two lifts, a first lift of the two lifts is arranged for the vertical transport of the large load carriers of the front high rack, and a second lift of the two lifts is arranged for the vertical transport of the large load carriers of the rear high rack.

18. The shelving system of claim 17, wherein:

each lift of the two lifts is arranged between two of the four transfer stations.

19. The shelving system of claim 17, wherein a change of position of a large load carrier between two of the four transfer stations is conducted indirectly via one of the two lifts after a change of level.

20. The shelving system of claim 17, wherein storage locations closest to the four transfer stations are configured as sequencing places, and the sequencing places are combined into the first sequencing area and the second sequencing area.

* * * * *